P. KELLEHER & C. SCHAFFER.
AUTOMOBILE WHEEL.
APPLICATION FILED FEB. 26, 1914.

1,169,651.

Patented Jan. 25, 1916.

Witnesses
M. S. Watson
A. Ellison

Inventors
P. Kelleher
C. Schaffer

Attorneys

UNITED STATES PATENT OFFICE.

PATRICK KELLEHER AND CHARLES SCHAFFER, OF WILMINGTON, DELAWARE.

AUTOMOBILE-WHEEL.

1,169,651.  Specification of Letters Patent. Patented Jan. 25, 1916.

Application filed February 26, 1914. Serial No. 821,201.

*To all whom it may concern:*

Be it known that we, PATRICK KELLEHER and CHARLES SCHAFFER, citizens of the United States, residing at Wilmington, in the county of New Castle, State of Delaware, have invented certain new and useful Improvements in Automobile-Wheels; and we do hereby declare the following to be a full, clear, and exact description of the invention, such as will enable others skilled in the art to which it appertains to make and use the same.

This invention relates to vehicle wheels and has special reference to spring wheels of a type well adapted for use on automobiles and the like.

The principal object of the invention is to provide an improved form of spring wheel which may be run without a pneumatic tire, or if such a tire be used will lengthen the life of the tire.

Another object of the invention is to provide a removable spring spoke end for use in connection with such a wheel.

With the above and other objects in view the invention consists in general of certain novel details of construction and combination of parts hereinafter fully described, illustrated in the accompanying drawings, and specifically claimed.

Figure 1:
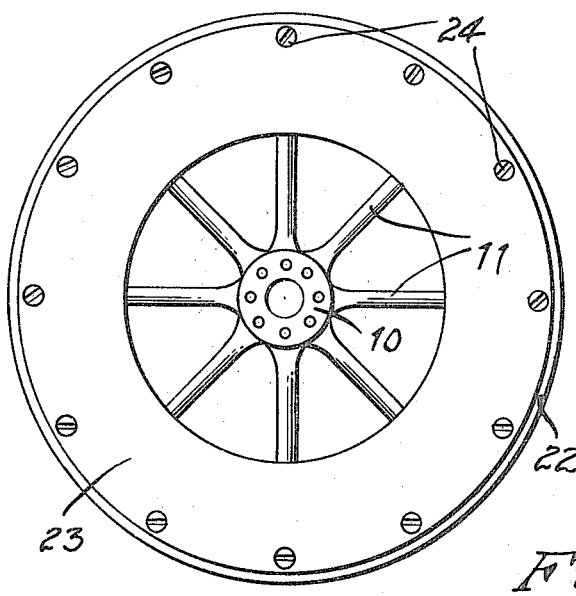
Figure 3:
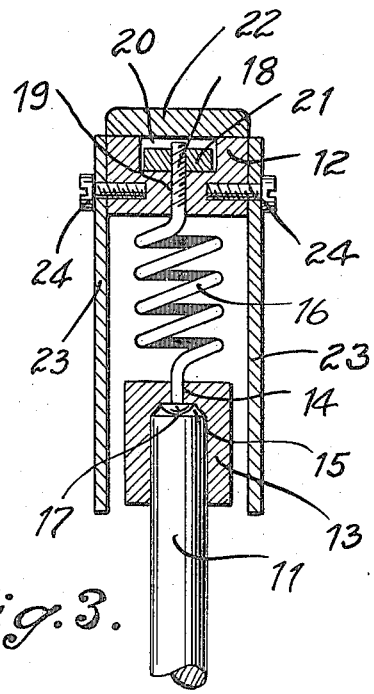
Figure 2:
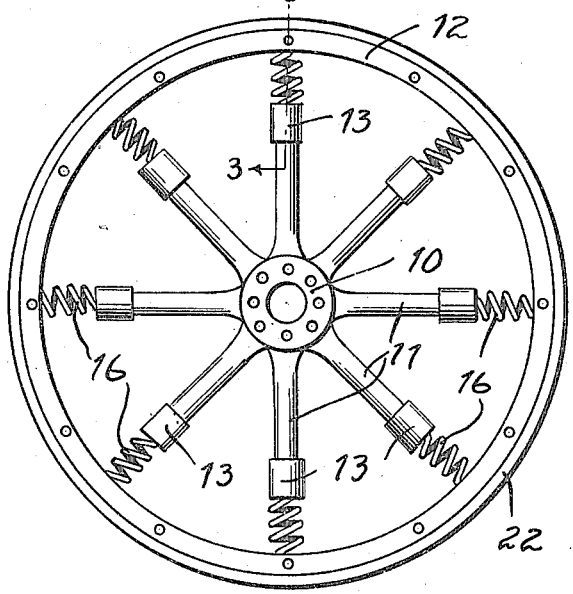
Figure 4:
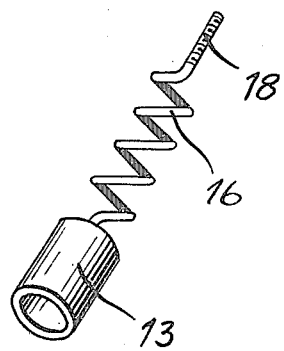

In the accompanying drawings, like characters of reference indicate like parts in the several views, and Figure 1 is a side elevation of the complete wheel, Fig. 2 is an elevation of the complete wheel with certain cover plates removed. Fig. 3 is an enlarged detail section on the line 3—3 of Fig. 2. Fig. 4 is a detail view of the spring spoke end removed from the wheel.

In carrying out the objects of this invention there is provided a wheel having the usual hub 10 and spokes 11 radiating therefrom. The wheel is also provided with a rim 12 which may, or may not as desired, be used to support a pneumatic or other rubber tire. This arrangement for holding the tire is not necessary to be shown in this instance as the same forms no part of the present invention.

The spokes 11 are of such length as to extend from the hub substantially half way toward the rim of the wheel and are connected to the hub by the improved removable spring spoke end. This spring spoke end consists of a cap 13 which is adapted to fit closely on the outer end of the respective spoke 11. This cap 13 is provided with an opening 14 extending through its closed outer end and enlarged as at 15. Extending through the opening 14 is the end of a coil spring 16, said end being riveted to fill the enlarged portion 15 of the opening as indicated at 17. This coil spring has its other end alined with the end 14 and threaded as indicated at 18. The threaded end 18 passes through a suitable opening 19 in the rim 12 and extends into a recess 20 on the outer face of said rim. On the threaded end is fitted a nut 21 which serves to hold the spoke in position in relation to the rim. In the present instance the rim is shown provided with the usual metallic tire 22 although, as explained above, it is obvious that a rubber or pneumatic tire may be used in place thereof.

Secured to the rim 12 in spaced relation to the springs 16 are the cover plates 23, the latter being held to the rim by suitable bolts and nuts as indicated at 24.

It will be obvious that the opening 19 may be threaded as desired and the nut 21 omitted.

With the device thus arranged when the wheel rolls over the ground the springs yield to the inequalities and the vehicle rides easily on its axle. In addition, a very important feature resides in the fact that if a spring by any chance becomes broken it may be readily replaced by simply unscrewing the outer part from the nut or opening, since when a nut is used the recess 20 is made to fit the nut and prevent rotation thereof. Then the cap 13 may be lifted off the spoke end 11 and a new spring substituted.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as properly come within the scope claimed.

Having thus described the invention, what is claimed as new, is:—

In a vehicle wheel the combination with the rim and spokes the former being provided with a circumferential channel and having an opening therethrough communicating with the channel, of a nut immovably seated within said channel and registering with said opening, a cap recessed to fit removably over the end of each of the spokes, and a coil spring arranged between said cap and ring with its ends disposed in a line centrally of the coil, one of said ends being swivelly engaged through said cap and terminating in a head seated within the recess, with the other of said ends loosely inserted through the opening in the rim and threadedly engaging said nut.

In testimony whereof, we affix our signatures, in the presence of two witnesses.

PATRICK KELLEHER.
CHARLES SCHAFFER.

Witnesses:
N. SCOTT VERNON,
GEORGE H. SCHAFFER.

Copies of this patent may be obtained for five cents each, by addressing the "Commissioner of Patents, Washington, D. C."